United States Patent [19]
Johnston

[11] Patent Number: 5,896,386
[45] Date of Patent: Apr. 20, 1999

[54] QUEUE MANAGEMENT METHOD FOR WIRELESS ASYNCHRONOUS TRANSFER MODE NETWORK INTERFACE CARD

[75] Inventor: Cesar A. Johnston, Franklin Park, N.J.

[73] Assignee: NEC USA, Inc., Princeton, N.J.

[21] Appl. No.: 08/791,737

[22] Filed: Jan. 31, 1997

[51] Int. Cl.$^6$ .......................................... H04J 3/16
[52] U.S. Cl. ........................ 370/466; 370/471; 370/474
[58] Field of Search ................................. 370/395, 336, 370/337, 474, 471; 455/556, 557

[56] References Cited

U.S. PATENT DOCUMENTS 5,684,791  11/1997  Raychaudhuri et al. ............ 370/278
5,764,896   6/1998  Johnson ............................ 395/200.8

FOREIGN PATENT DOCUMENTS

WO 93/19559  9/1993  WIPO.

OTHER PUBLICATIONS

D. Raychaudhuri et al.; "WATMnet: A Prototype Wireless ATM System for Multimedia Personal Communication"; Jun. 23, 1996; pp. 469–477.

D. Raychaudhuri, et al, "ATM–Based Transport Architecture for Multiservices Wireless Personal Communication Networks", IEEE JSAC, vol. 12, No. 8, Oct. 1994.

D. Raychaudhuri, et al, "WATMNet: A Prototype Wireless ATM System for Multimedia Personal Communication", ICC '96.

R. Dighe et al, "The Multimedia C&C Platform (MCCP), A Network–Centric Architecture for Multimedia", IEEE ATM Workshop, Oct. 1995.

R. Dighe et al, "Architecture and Performance of HIPPI–ATM–SONET Terminal Adapters", IEEE Communications, vol. 33, No. 4, Apr. 1995.

*Primary Examiner*—Jeffery A. Hofsass
*Assistant Examiner*—Clement Townsend
*Attorney, Agent, or Firm*—Sughrue, Mion, Zinn, Macpeak & Seas, PLLC

[57] ABSTRACT

A queue management method for a wireless asynchronous transfer mode Network Interface Card (NIC) for integrating computers and other electronic equipment to a Wireless Asynchronous Transfer Mode (WATM) network is constructed so as to efficiently exchange data between a host and the wireless network. In addition to providing both ATM and AAL layer transfer protocols, the NIC also provides Data Link Control (DLC), Media Access Control (MAC), and Radio Physical (RPhy) layers as well.

1 Claim, 18 Drawing Sheets

```
TYPEDEF STRUCT {
UNSIGNED CHAR GFC      :4;
UNSIGNED CHAR VPIH     :4;
UNSIGNED CHAR VPIL     :4;
UNSIGNED CHAR VCIH     :4;
UNSIGNED CHAR VCIM     :4;
UNSIGNED CHAR VCIL     :4;
UNSIGNED CHAR PTi      :3;
UNSIGNED CHAR CLP      :1;
} ATMH;
```

FIG. 7(a)

```
TYPEDEF STRUCT {
UNSIGNED CHAR CPI         ;
UNSIGNED CHAR BTAG        ;
UNSIGNED SHORT BASIZE     ;
UNSIGNED CHAR ETAG        ;
UNSIGNED SHORT LENGTH     ;
} CS34;
```

```
TYPEDEF STRUCT {
UNSIGNED CHAR STYPE    :2;
UNSIGNED CHAR SN       :4;
UNSIGNED CHAR MIDH     :2;
UNSIGNED CHAR MIDL     ;
UNSIGNED CHAR LIND     :6;
} SAR34;
```

FIG. 7(b)

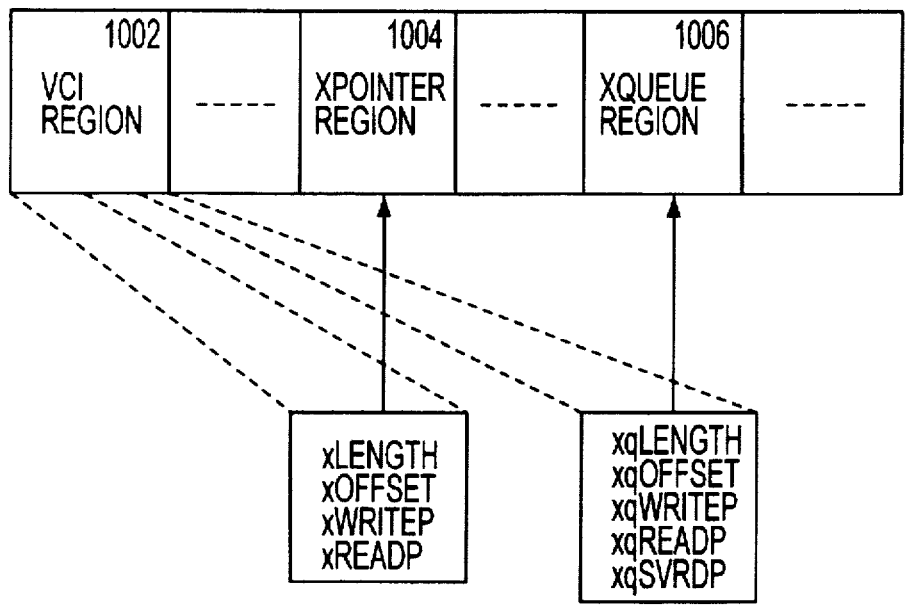
FIG. 10(a)
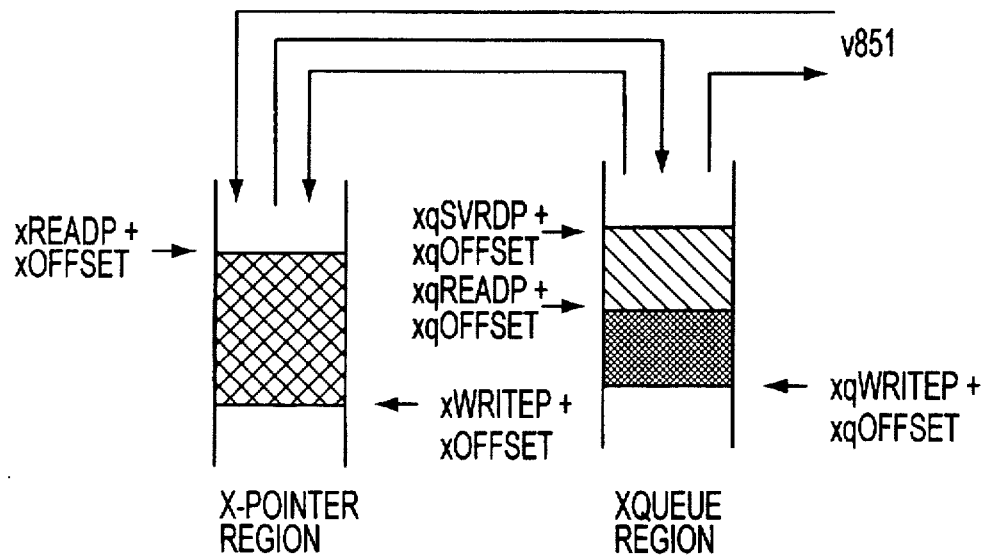
 FREE POINTERS
 CELL POINTERS OF TRANSMITTED CELLS AWAITING DLC ACKNOWLEDGEMENT
 CELL POINTERS READY FOR TRANSMISSION.
FIG. 10(b)

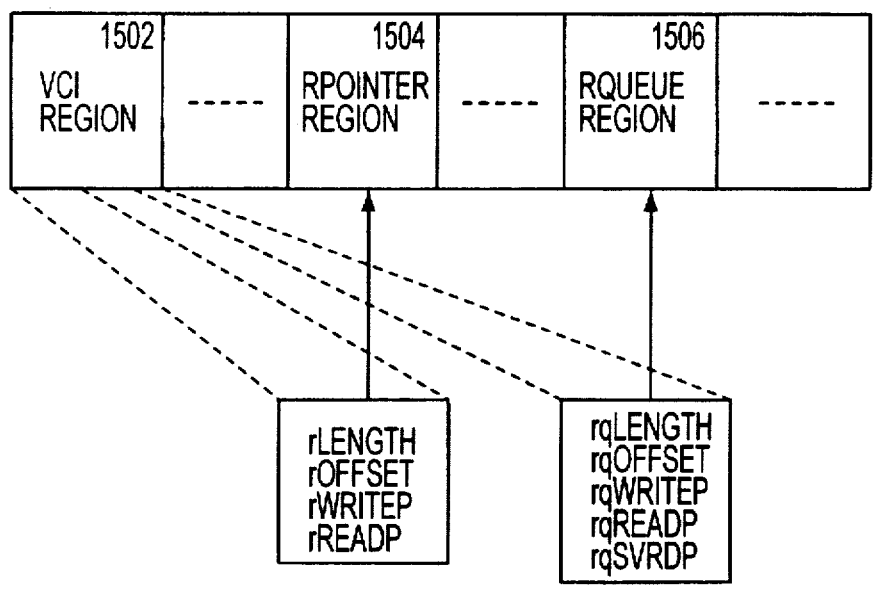
FIG. 15(a)
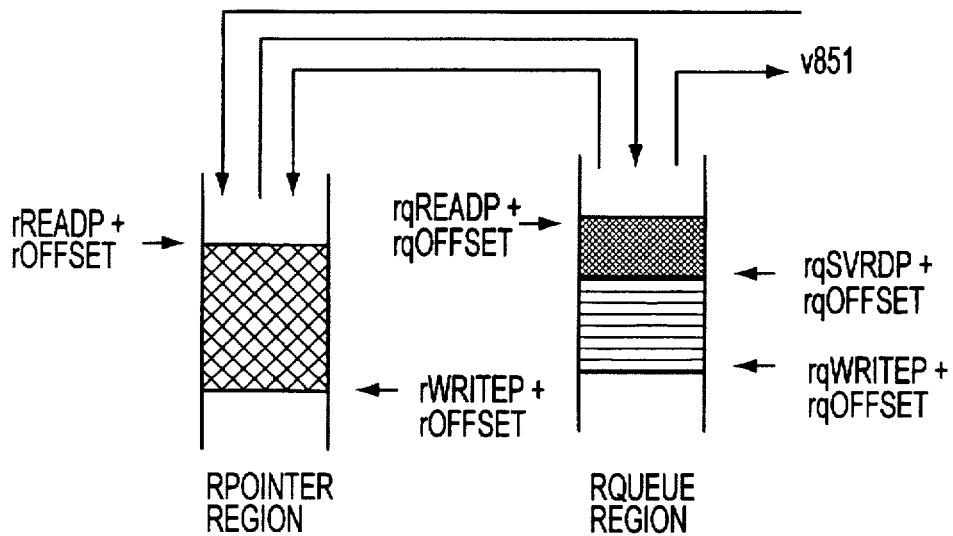
 FREE POINTERS
 CELL POINTERS OF RECEIVED CELLS WHICH ARE IN ORDER AND READY FOR TRANSFER TO TERMINAL
 CELL POINTERS AWAITING ACKNOWLEDGEMENT.
FIG. 15(b)

QUEUE MANAGEMENT METHOD FOR WIRELESS ASYNCHRONOUS TRANSFER MODE NETWORK INTERFACE CARD

BACKGROUND OF THE INVENTION

This invention relates generally to the field of telecommunications and in particular to a queue management method for a wireless Asynchronous Transfer Mode (ATM) network interface card (NIC).

Asynchronous Transfer Mode (ATM) has long been advocated as an important technology for interconnecting wide area heterogeneous networks. In networks constructed utilizing ATM technologies, transported data is divided into small, fixed length units called cells. These cells are further divided into a header and data portion, with the header portion comprising identification, priority and routing information, and the data portion comprising actual data transported between systems.

An important distinguishing characteristic of ATM and networks constructed therefrom, is that it is an end-to-end technology, meaning that with ATM networks the protocols (ATM) are uniform throughout the entire network. That is to say, the ATM on the desktop is the same as the ATM on the Local Area Network (LAN), is the same as the ATM on the Wide Area Network. Consequently, organizations that employ ATM networks do not need extra equipment (like routers or gateways) to interconnect their networks thereby reducing the cost and complexity of the networks while at the same time improving their flexibility.

Due to these and other inherent advantages, there has been widespread and rapid deployment of ATM networks. This rapid deployment of ATM networks, and the contemporaneous need to provide reliable wireless ubiquitous information access to end users, has accelerated the development of Wireless ATM (WATM) networks. Presently, the development of WATM networks is still research oriented, and efforts to specify a standard for its protocol reference architecture are underway. See, for example, the article by D. Raychaudhury et al. entitled "ATM-Based Transport Architecture for Multiservices Wireless Personal Communication Networks", which appeared in Vol. 12, No. 8 of IEEE JSAC in October 1994, or proceedings. An example of a Wireless ATM network which has been prototyped to ascertain the requirements for future WATM network has been described by D. Raychaudhury et al., in an article entitled "WATMnet: A Prototype Wireless ATM System for Multimedia Personal Communication", ICC '96.

In WATMnet, as well as in other WATM networks, a Network Interface Card (NIC) is used to interface a piece of equipment to the WATM network. As can be readily appreciated by those skilled in the art, the architecture of a NIC plays an important role when accessing a high-performance network such as ATM. Specifically, the NIC can become a network bottleneck if its throughput characteristics are not taken into consideration while designing its architecture. Since the Data Link Control Layer (DLC), the Media Access Control Layer (MAC), and RPhy layers are integrated in a WATM NIC, the WATM NIC's processing requirements are more demanding than that of ATM NICS at equivalent transmission rates. (See, for example, R. Dighe et al., "The Multimedia C&C Platform (MCCP), A Network-Centric Architecture for Multimedia", IEEE ATM Workshop '95, October 1995; and C.A. Johnston, "Architecture and Performance of HIPPI-ATM-SONET Terminal Adapters", IEEE Communications, Vol. 33, No. 4, April 1995.) Thus, the design of a high-throughput WATM NIC software/hardware architecture remains a challenging problem.

Critical for the usefulness of such NIC adapters, is an efficient architecture that can allow network communications to proceed in parallel with other operations on a host without excessively slowing down those operations. Also critical to the efficiency of the entire network is a need that the adapter have minimal latency in reception and transmission of data. At the same time, the adapter must be economical to be suitable for accompanying host equipment.

Therefore, a need exists in the art for apparatus and methods which provide for the efficient and flexible wireless interfacing of computer and other electronic devices to ATM networks.

SUMMARY OF THE INVENTION

According to the invention, a network interface card that provides an interface between a host and a wireless asynchronous transfer mode based communications network, effectively and efficiently offloads and unburdens the host from the formatting, error checking and transmission of data over the wireless network. The network interface card advantageously employs an on-board controller, a local memory, on-board framing and error checking, as well as wireless transmission and receiving.

As a further aspect of the network interface card, data that is to be transmitted or received is advantageous stored within the network interface card according to type, thereby allowing the card to support a number of known, network protocols. As a still further aspect of the network interface card, an entire data link control protocol layer is provided on-board the card, further off loading the host from this low level function. Importantly, and in accordance with the method of the present application, data cells which are transmitted are transmitted in a particular sequence until an error in the data link occurs. Upon such condition, the data link recovery procedure is handled by a control processor on the card while, in parallel, remaining cells are transmitted in a particular sequence. Similarly, data cells which are received from the wireless network are received in a particular sequence until an error in the data link occurs. Upon such condition, the data link recovery procedure for is handled by a control processor on the card while, in parallel, remaining cells are received in a particular sequence.

A further understanding of the nature and advantages of this invention may be realized by reference the remaining portions of the specification and drawing.

BRIEF DESCRIPTION OF THE DRAWINGS

The teachings of the present invention can be readily understood by considering the following detailed description in conjunction with the accompanying drawings, in which:

FIG. 7(a) and 7(b) show examples of representative data structures in the v851 processor;

FIG. 10(a) shows Pointer Processor Transmitter RAM Partitioning;

FIG. 10(b) shows the XQueue Region functionality of FIG. 10(a);

FIG. 15(a) shows Pointer Processor Receiver RAM Partitioning;

FIG. 15(b) shows the Queue Region functionality of FIG. 15(a);

DETAILED DESCRIPTION

A preferred embodiment of the invention will now be described while referring to the figures, several of which may be simultaneously referred to during the course of the following description.

Figure 1:
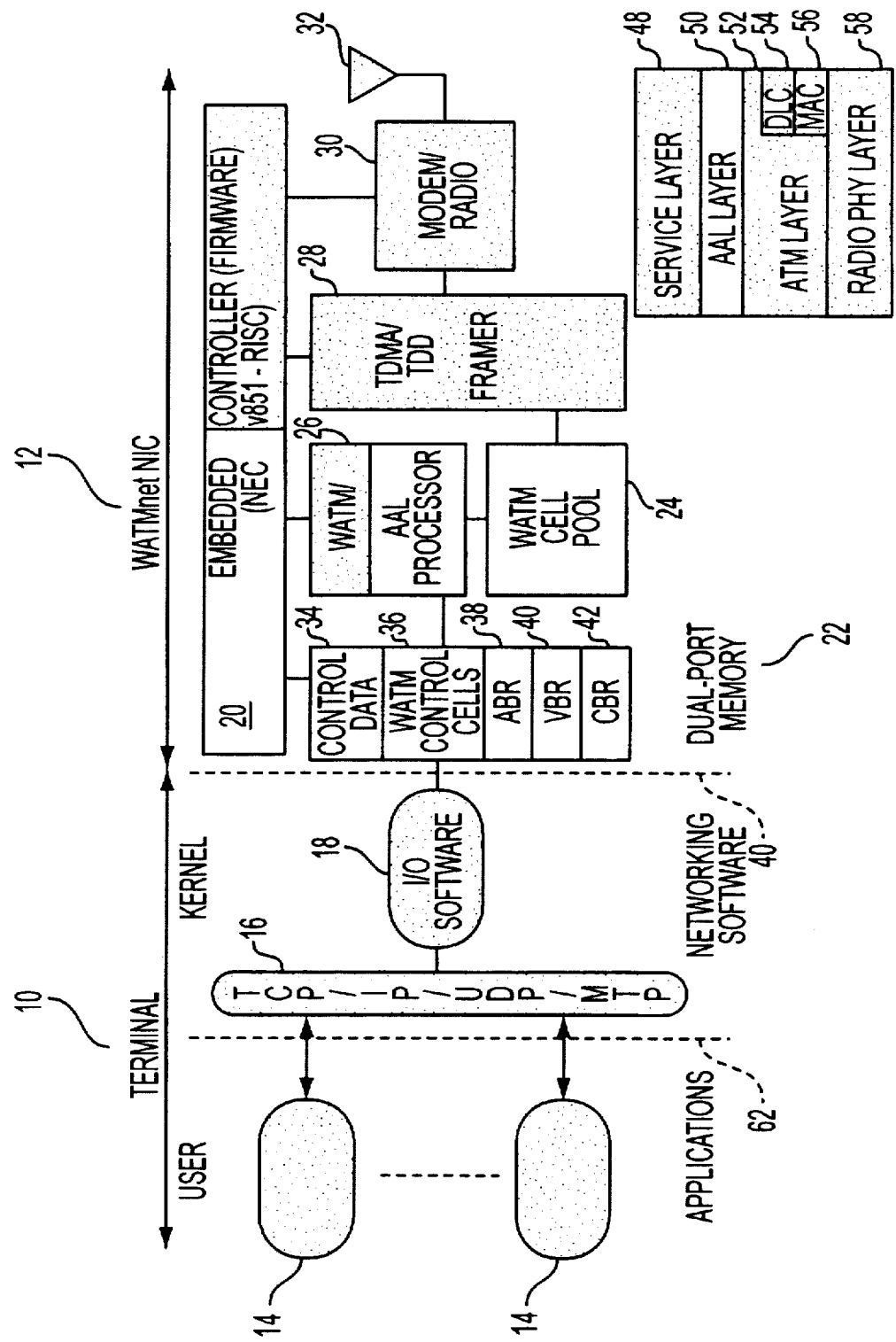
FIG. 1 shows a block diagram of a WATM NIC according to the teachings of the present invention.

Referring to FIG. 1, a block diagram is shown of a Wireless Network Interface Card (WATMNIC) according to the present invention for communications between a client terminal and a wireless Asynchronous Transfer Mode Network.

With further reference now to FIG. 1, multimedia applications 14, running under any one of a variety of well-known operating systems, interface with a Host Kernel to access networking software such as Transmission Control Protocol/Internet Protocol (TCP/IP), User Datagram Protocol (UDP), or MTP, 16. As is known in the art, TCP/IP is often used and well suited for applications which do not require real time performance. However, in order to support real-time traffic such as CBR or VBR, other protocols such as MTP must be supported at the Mobile as well.

Figure 2:
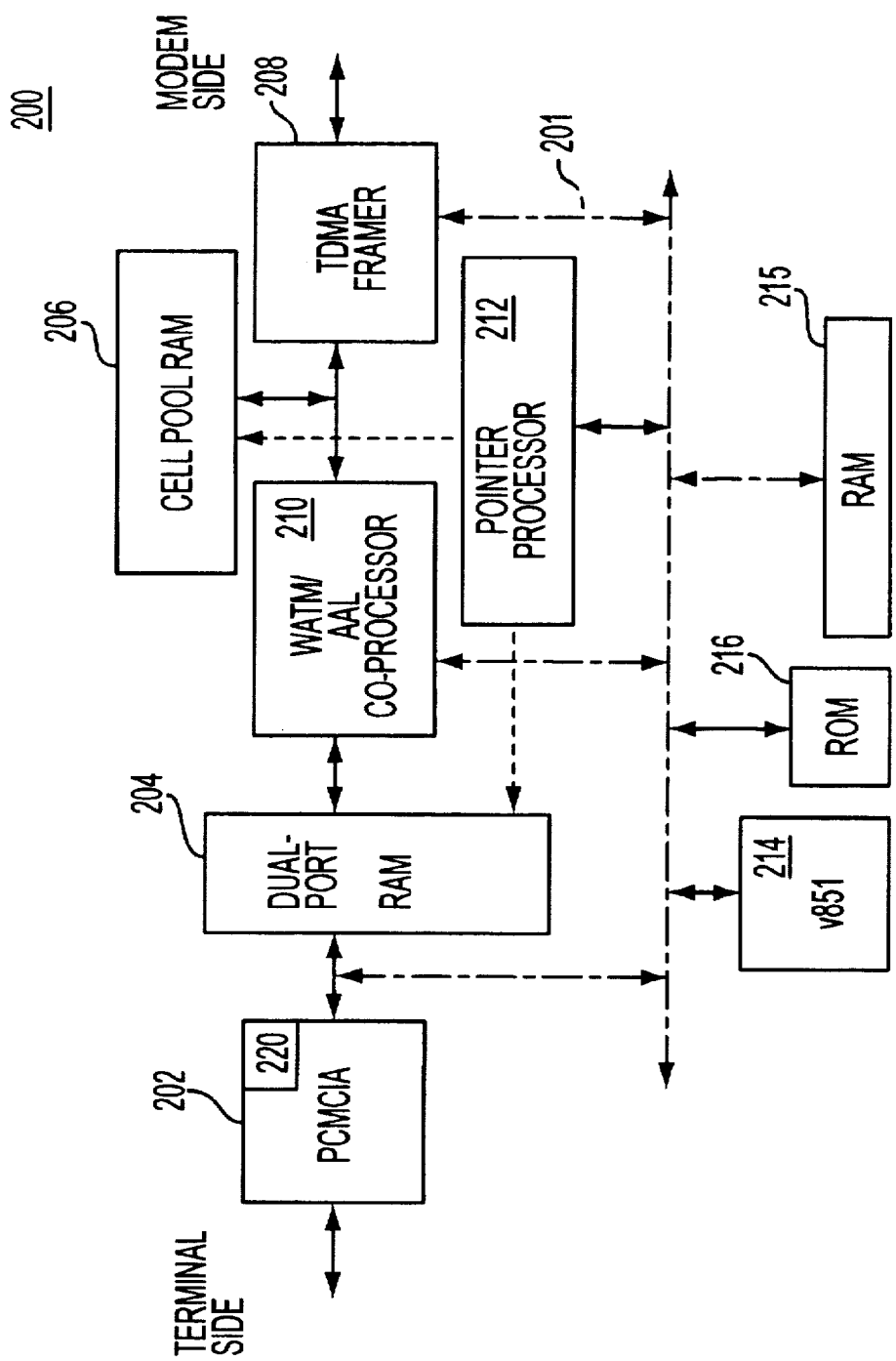
FIG. 2 shows a simplified block diagram of the WATM NIC architecture of FIG. 1.

With reference now to FIG. 2, there it shows a block diagram of a Network Interface Card 200 according to the present invention. The functional blocks comprising the Network Interface Card include PCMCIA interface 202, Dual-Port RAM 204, WATM/AAL processor 210, Cell Pool Ram 206, TDMA Framer 208, Pointer Processor 212, RAM 218, ROM 216 and Microcontroller 214 each interconnected via electrical and mechanical interconnect 201.

The PCMCIA Interface 202 is preferably implemented using a commercially available integrated circuit (IC) which supports the PCMCIA version 2.1 standard. Through the PCMCIA interface, Terminal equipment (not shown) accesses a Dual-Port RAM 204, in a PCMCIA Common Memory configuration, to move data in and out of the NIC. Access to the Dual-Port RAM is shared with the Microcontroller 214, i.e., v851 RISC processor, under the control of an arbiter 220, implemented within the PCMCIA block. The arbiter gives higher access priority to the Microcontroller, which also maps its memory space to access the Dual-Port RAM. Through the Dual-Port RAM, Terminal equipment communicates with the network, and also exchanges information with the Microcontroller. Similarly, the Microcontroller can also exchange data with the network. This architecture allows to implement functions such as ATM signaling on board the NIC.

The Dual-Port RAM 204 allows the decoupling of a terminal and network side of the NIC. In this configuration, the NIC throughput performance is improved by allowing the transfer of data from Terminal Equipment, or Microcontroller to the memory to occur while the network side simultaneously stores incoming data.

Figure 3:
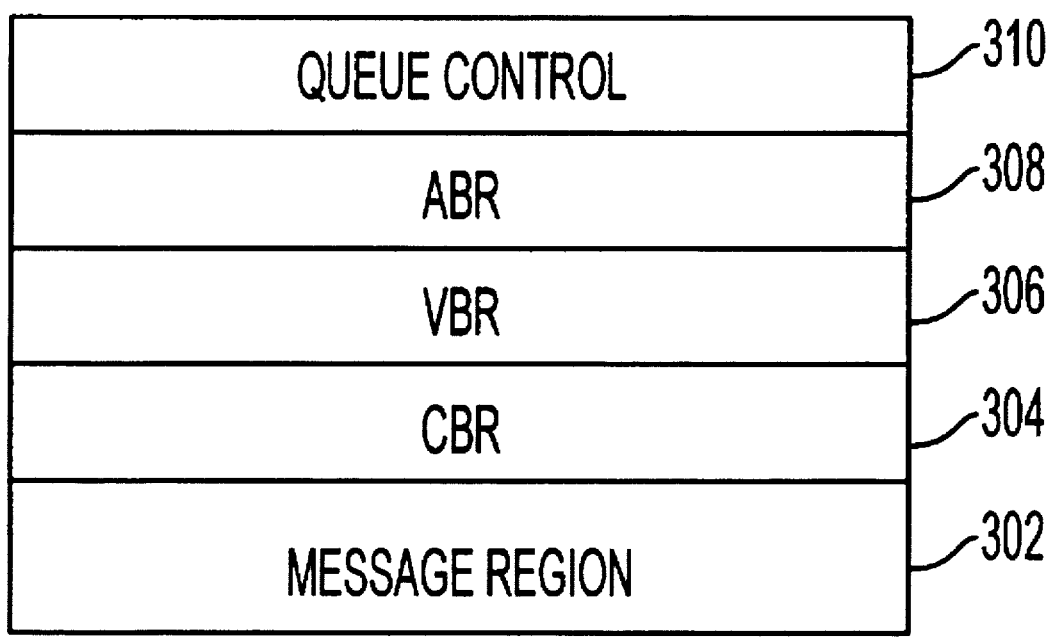
FIG. 3 shows dual-port RAM partitioning according to the present invention.

The Dual-Port RAM is partitioned in different regions as shown in FIG. 3. The Message region 302 allows for the exchange of control messages between the Terminal Equipment and the Microcontroller, and between the Microcontroller and the wireless network. The ABR 308, VBR 306, and CBR 304 regions implement a First In-First Out (FIFO) functionality to buffer the wireless traffic. Two FIFO's are incorporated per traffic class, one in the transmit direction and one in the receive direction. The Queue Control region 310 contains data structures to accomplish the FIFO functionality of the ABR, VBR, CBR, UBR, and Message regions. Those skilled in the art will quickly recognize that there can be many buffers contained within a region.

Figure 4:
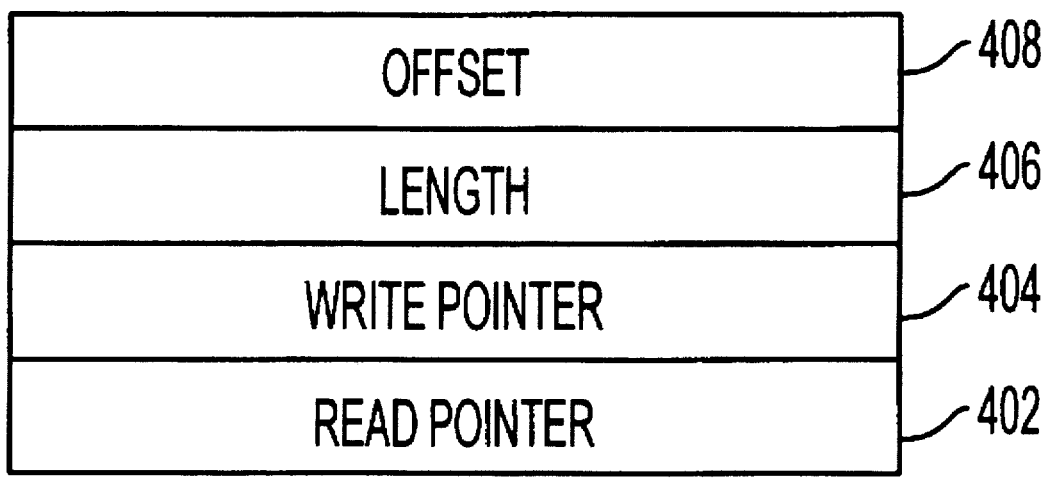
FIG. 4 shows a Queue Control Region FIFI Data Structure.

FIG. 4 shows the Queue Control Region FIFO Data Structure 400. This region consists of data structures required to achieve FIFO functionality of the ABR, VBR, CBR, and Message regions. The Offset parameter 408 indicates the start address of the FIFO in the RAM space. The Length parameter 406 indicates the size of the FIFO being implemented. The Write Pointer 404 stores the distance value from the Offset where data is stored. The Read Pointer 402 is used in combination with the Offset parameter to indicate where data is to be retrieved from.

Whenever the Write and Read pointers are of equal value, the FIFO is empty. If the Write pointer starts catching up with the Read Pointer after a number of writes, the FIFO is considered full if the Write Pointer plus one is equal to the Read Pointer. When a FIFO is full, incoming data is dropped. The values of the Write and Read pointers are always reset to zero when either pointer reaches the value of the Length parameter, effectively creating a circular buffer. FIFO occupancy can be determined by using the Length, Write and Read pointers. If the Write pointer value is greater than the Read Pointer, then the FIFO occupancy is determined by the difference between the Write and Read pointer values. Otherwise, the occupancy is determined by subtracting from the Length, the value of the difference between the Read and Write pointers.

FIFO functionality is implemented in each of the ABR, CBR and VBR regions to store and retrieve data. The ABR region stores Available Bit Rate data, the VBR stores Variable Bit Rate data, and the CBR region stores Constant Bit Rate data. Preferably, two FIFOs are implemented per region, one in the transmit direction and one in the receive direction. For each direction, a FIFO utilzes the structures previously described.

Figure 5:
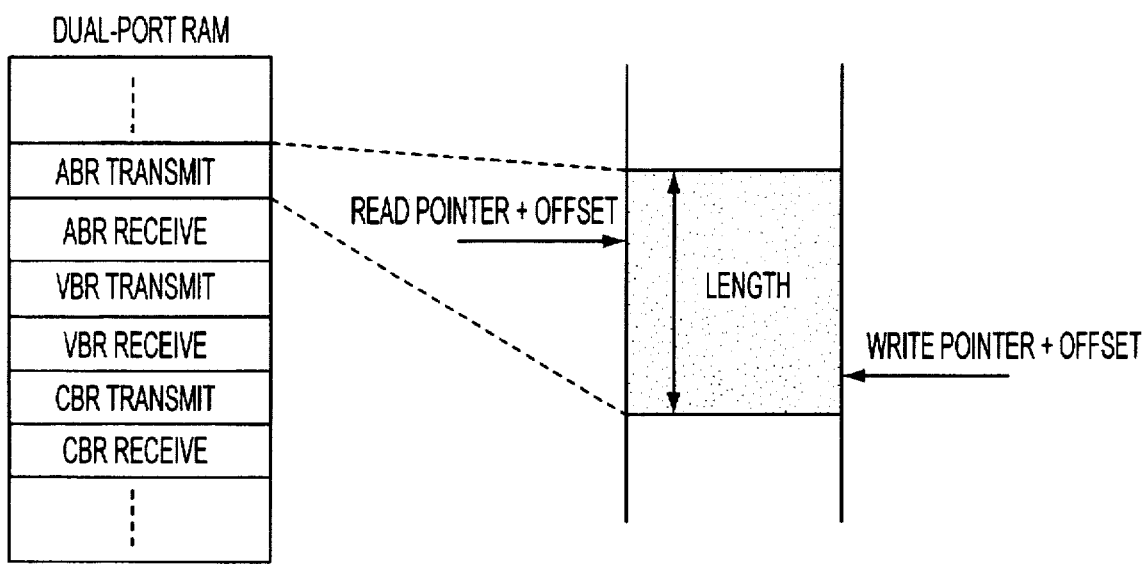
FIG. 5 shows FIFO implementation according to the present invention.

FIG. 5 shows an example of how FIFOs are implemented by partitioning the Dual-Port RAM. In this scheme, different FIFO sizes, based on the traffic class buffering requirements, can be obtained. By having different traffic class buffers, it is possible to implement a scheduling algorithm at the terminal to optimize the movement of time-sensitive data through the PCMCIA interface. Otherwise, it is also possible to implement a single FIFO area for movement of data across the PCMCIA interface to simplify the Terminal software implementation.

The Message region comprises four FIFOs implemented as described above. Two of the FIFOs provide for the storage of messages associated with Terminal to Microcontroller communications, while the other two provide for the transfer of messages between the Microcontroller and the wireless network. For example, before any connection can be established, the Microcontroller will use two of the FIFOs to run ATM signaling software with the WATM network. Once a signaling Virtual Circuit Identifier has been established, the Microcontroller will communicate with the Terminal thereby establishing connections in either the outgoing or incoming direction. When a Terminal requests to establish a connection, it will petition for permission to access the NIC resources through the Terminal to Microcontroller FIFOs.

The WATM Co-processor exhibits a pipeline architecture which allows for the flexible formatting of AAL 1, ¾ and 5, as well as ATM, and WATM cells. The Co-processor architecture has been designed by identifying generic building blocks required in the implementation of the above named transfer protocols. The WATM AAL Co-processor attaches to a main RISC CPU, in this case the v851, to relieve it from the burden of time-consuming operations by offering fast customized hardware processing. In general, the v851 keeps track of data structures on a per connection basis while data movement and formatting is performed by the Co-processor. In this manner, the v851 operating cycles are saved and can be effectively used to perform other functions.

Figure 6:
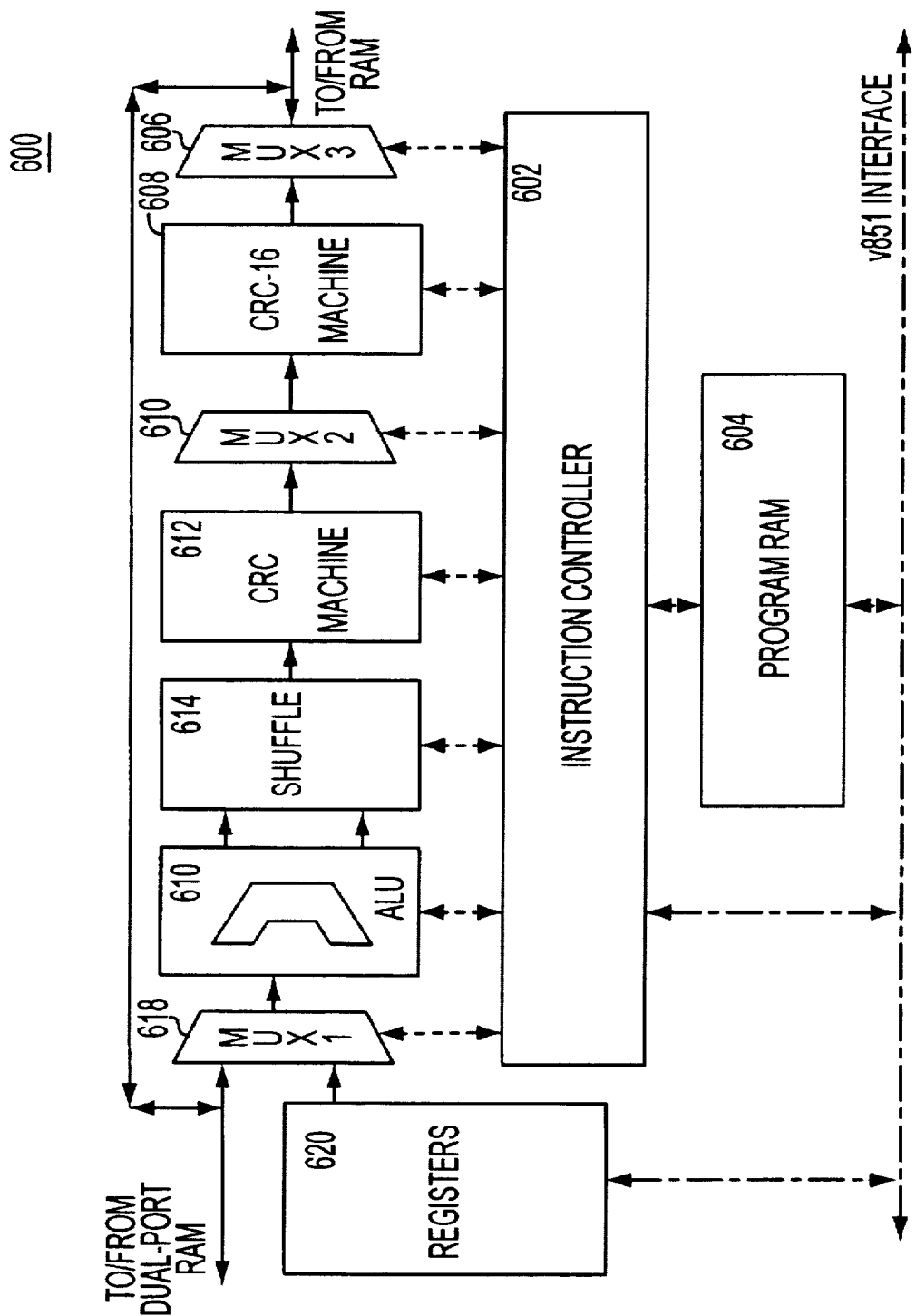
FIG. 6 is a block diagram showing WATM AAL Co-Processor architecture according to the present invention.

A block diagram of the Co-processor is shown in FIG. 6. It comprises seven pipeline stages containing generic blocks that can be effectively shared to obtain the formatting of the different AAL, ATM and WATM transport protocols. Preferably, the Co-processor is memory mapped to the v851 to control its operation. Sets of instructions implementing the AAL, ATM, and WATM protocols are stored in the Program RAM 604, where they are accessed and interpreted by the Instruction Controller 602.

The Registers 620 are accessed by the v851 to insert protocol overhead data. The overhead data is stored in firmware structures within the v851. With reference now to FIG. 7, there it shows C-language structures for an ATM header (atmh), AAL¾ convergence sub-layer (cs34), and segmentation and reassemble sublayer overhead (sar34). In a transmission scenario, the v851 writes the contents of the software structures in the Registers, and it then initiates the Instructions Controller to start the desired protocol formatting program. At such time, the Co-processor handles data movement and data formatting. No further involvement is required by the v851. Thus, the v851 is relieved of time-consuming operations and can be effectively used in other operations. When the Co-processor is finished with its required instructions, the v851 data structures for a given connection can be updated with the values to be used in the next transmission cycle.

During data formatting, and with continued reference to FIG. 6, overhead is multiplexed by MUX1 618 from the Registers with data from the Dual-Port RAM (not shown) to form the desired overhead/data combination. The Co-processor incoming data is then circulated through the ALU stage 616 which performs operations such as adding one to increment Sequence Number (SN) overhead, or to perform comparison when SN are received from the network. Data is then operated on by the Shuffle stage 614, which performs dedicated AAL 1 and AAL ¾ bit shifting manipulations in one cycle time. Subsequently, within the CRC Machine stage 612, specialized hardware implements CRC-3, CRC-8, CRC-10, and CRC 32 which operates simultaneously on the data continuously. When a CRC has been calculated, it is then inserted through the multiplexer MUX2 610 at a location controlled by the Co-processor program. For Wireless ATM applications the CRC-16 machine 608 allows the generation of CRC overhead and attaches it to the data through the control of the third multiplexer MUX3 606. The output of MUX3 is stored in the Cell Pool RAM (not shown) under the control of the Pointer Processor.

The Pointer Processor (PP) generates memory address locations where data is to be stored or retrieved by the WATM AAL Co-processor, and by the TDMA block of FIG. 2. The PP includes two parts, the first (PP-I) controls the information writing or reading of the Dual-Port RAM, and the second (PP-II) implements queue management of the Cell Pool RAM.

Figure 8:
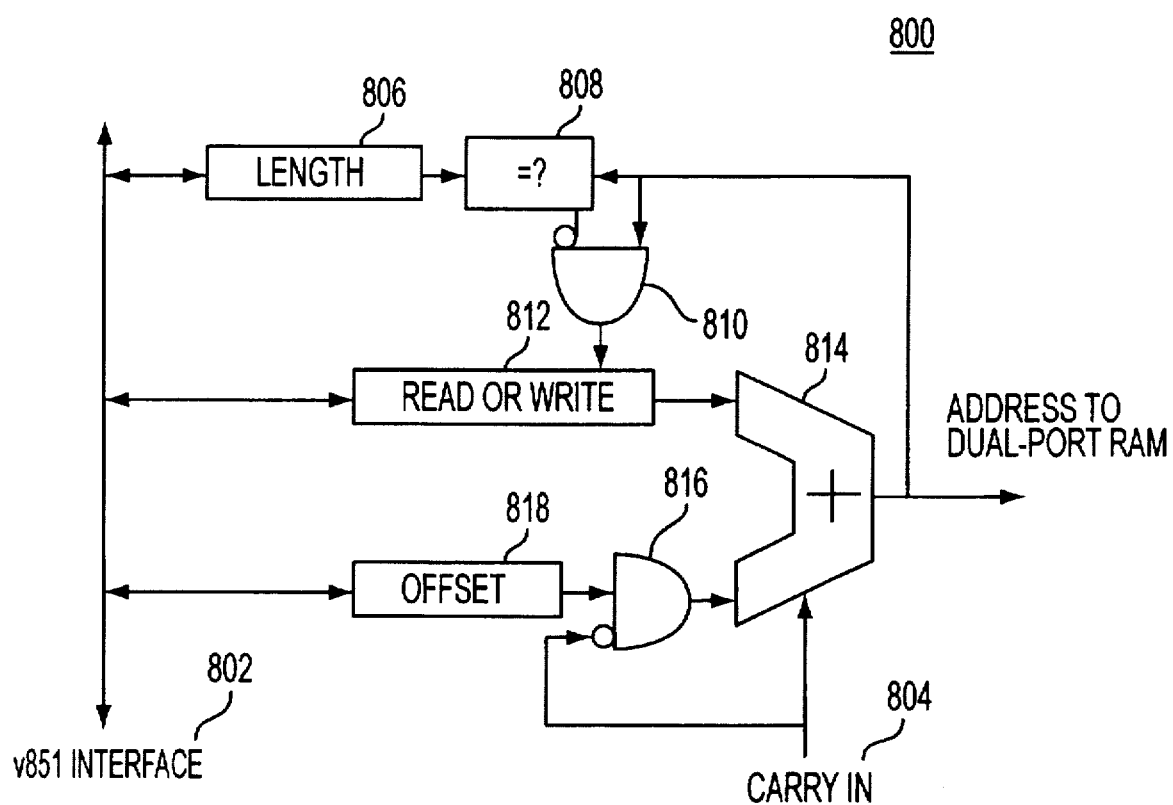
FIG. 8 depicts dual-port address generation.

FIG. 8 shows one implementation of the PP-I address generator side 800. Through the v851 interface 802 internal registers are loaded with the values contained within the Queue Control Region. In a store cycle, the Write pointer is used, while in the retrieve cycle the Read pointer is used. These pointers are incremented by one by the 'Carry In' signal. The Length value is compared with the adder output to rollover the Read or Write pointers to zero whenever the FIFO length is reached. In this manner, a circular queue functionality is effectively achieved. By adding the Read or Write pointers to the Offset value, the address where data is to be stored or retrieve at the Dual-Port RAM is obtained. After a write or read cycle is finished, the v851 retrieves the new Write or Read pointers and updates the Queue control structure for later use.

Figure 9:
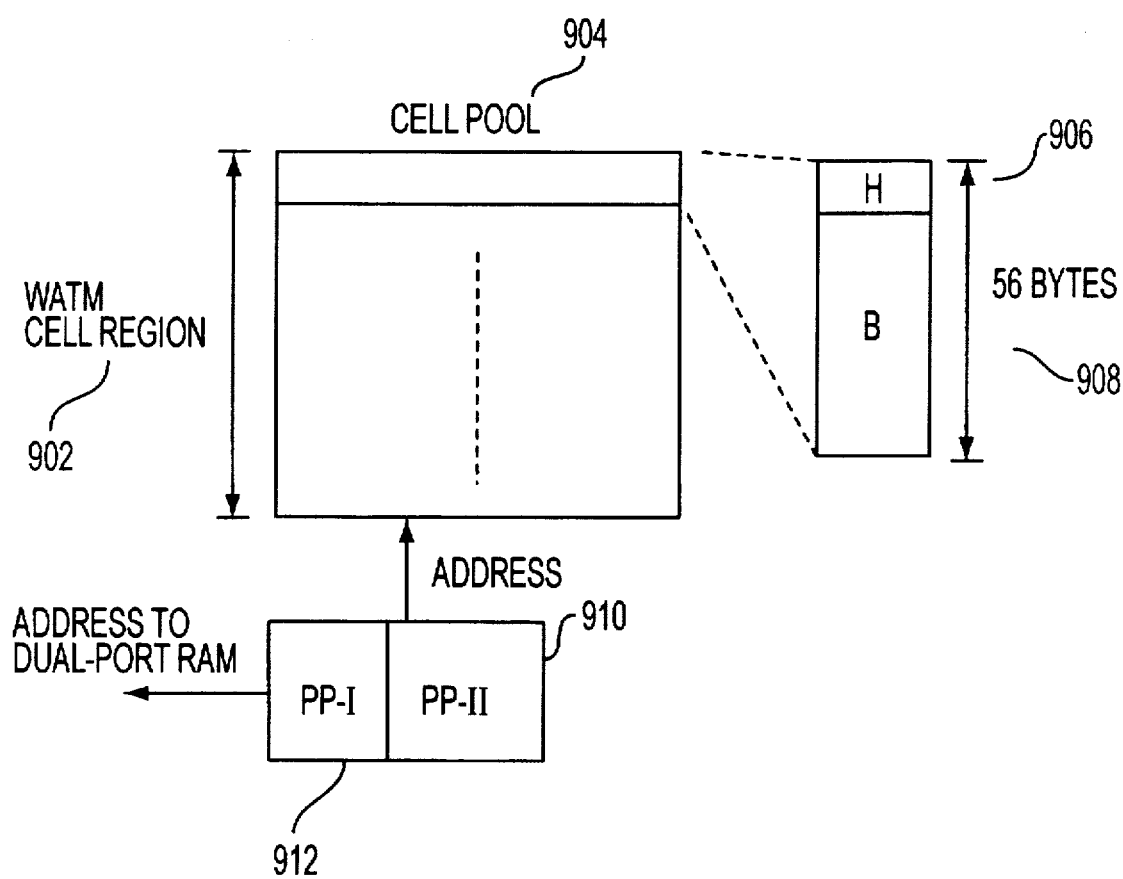
FIG. 9 shows the Cell Pool RAM partitioning.

The PP-II generates the memory address locations for the Cell Pool RAM. It provides queue management control on a per connection basis, while also providing functionality that is required to support the DLC protocol. The Cell Pool RAM is partitioned as shown in FIG. 9. The WATM Cell Region 902 is partitioned into a number of 56 byte regions, each region having a header 906 and a body 908 and which serve to store WATM cells in the transmit and receive directions. WATM cells can then be linked by managing pointers using the following technique that merge FIFO Queue Management and DLC operation requirements in a single novel architecture.

Advantageously, ATM queue management and DLC is merged in such a manner as to support virtual queues on a per connection basis with the capabilities of WATM cell retransmission and cell reordering.

With reference now to FIG. 10 (a), there it shows the partitioning of RAM memory residing within the Pointer Processor Unit shown in FIG. 2 in the transmit direction. A VCI Region consists of data structures which permit the emulation of FIFO functionalities of the Xpointer 1004 and Xqueue 1006 regions, respectively. The Xpointer Region contains free start address pointers which indicate where WATM cells can be stored in the Cell Pool RAM. These pointers are stored in a FIFO manner using any of a variety of techniques. The XQueue region contains the address pointers of stored cells in the Cell Pool RAM.

Figure 11:
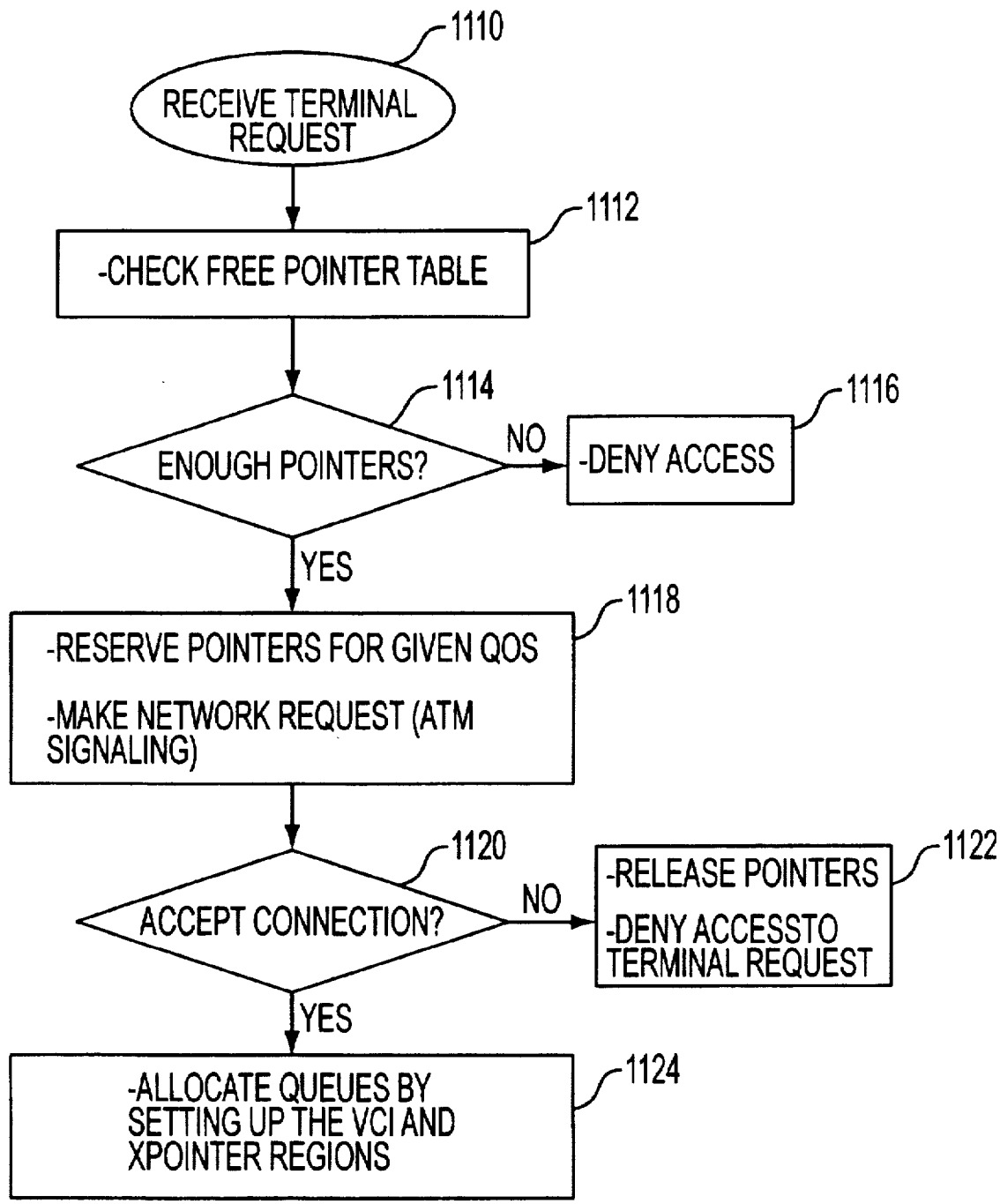
FIG. 11 is a flow diagram showing connection setup of a terminal to the v851.

FIG. 10(b) shows the structure of the Xpointer and XQueue Regions. The size of the Xpointer Region determines the queue size for a given connection based on its quality of service (QOS) requirements. A number of Address Pointers which guarantee the required QOS is stored in this region. These pointers are referred to as Free pointers, and are initially managed within the v851. Upon a connection setup request by the Terminal, the v851 is responsible for performing the operations shown in the flowchart of FIG. 11. A similar operation is also required to set up the received queue.

Figure 12:
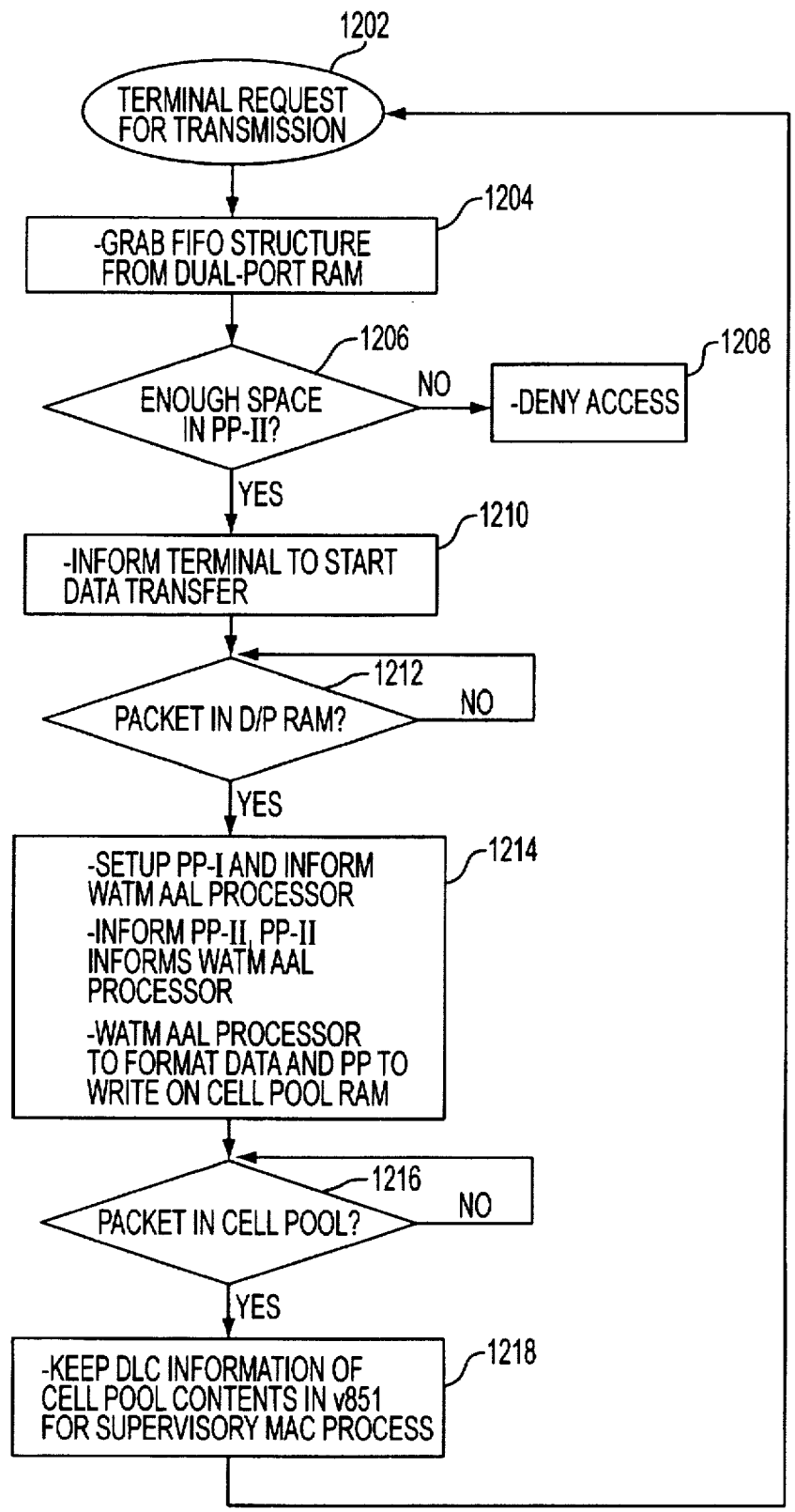
FIG. 12 is a flow diagram showing terminal data transfer to the NIC.
Figure 13:
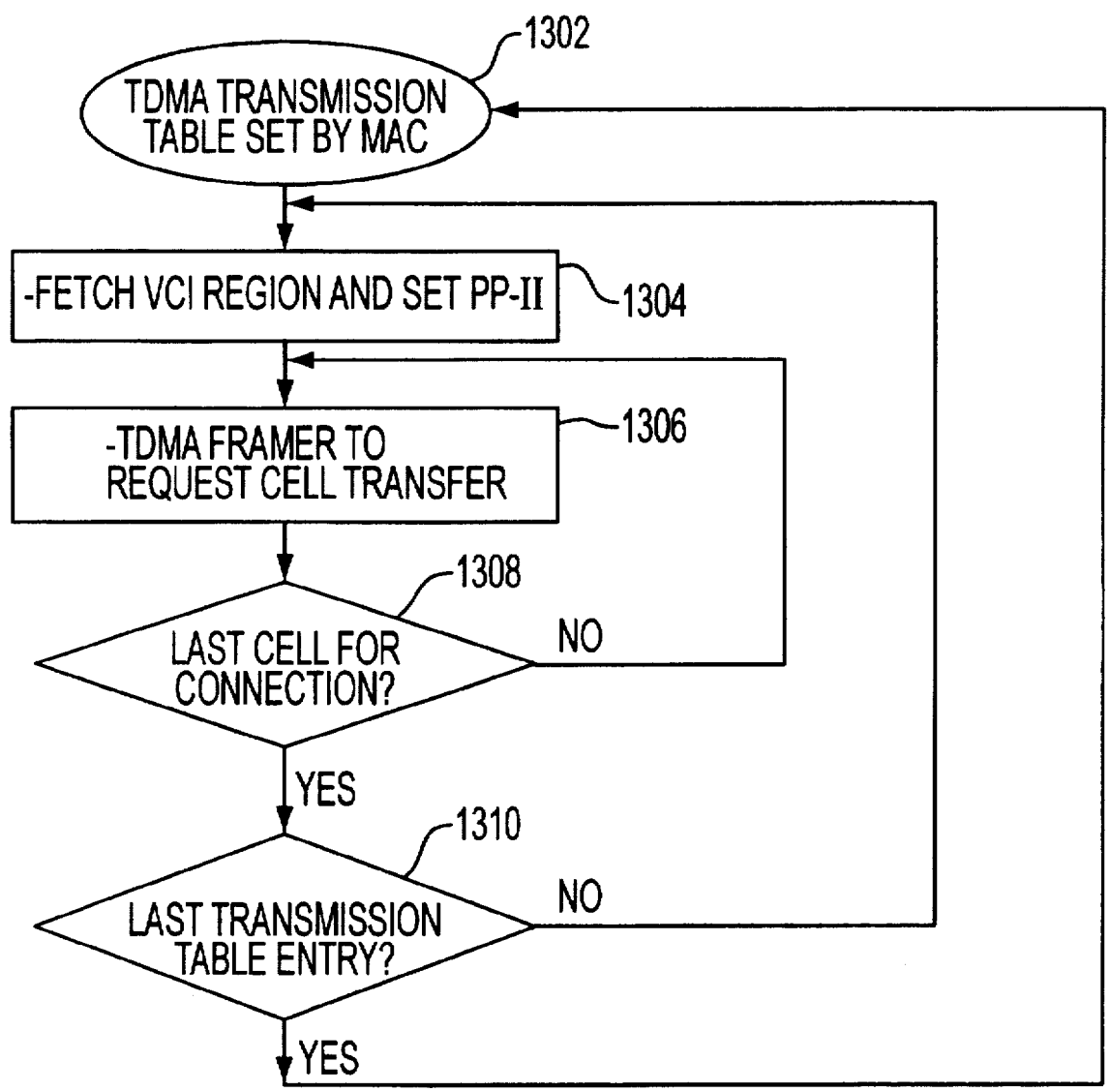
FIG. 13 is a flow diagram showing data transmission from NIC to wireless network.

When a data transmission is made by the Terminal, the process depicted in the flowchart shown in FIG. 12 is performed thereby moving data through the Dual-Port RAM to the Cell Pool RAM. A Free pointer (FIG. 10(b)) in the Xpointer region is moved to the XQueue region when a cell has been written to the Cell Pool Ram. The X-Queue region implements the standard FIFO implementation. The 'xqWritep' is incremented as WATM cells are stored in the Cell Pool RAM, while the 'xqReadp' is decremented every time the TDMA Framer (FIG. 2), transmits data to the wireless network. The FIFO occupancy given by the 'xqWritep' and 'xqReadp' pointers is used by the Supervisory MAC to determine how much data is to be transmitted. FIG. 13 shows the steps required to transmit WATM cells by the TDMA Framer.

Figure 14:
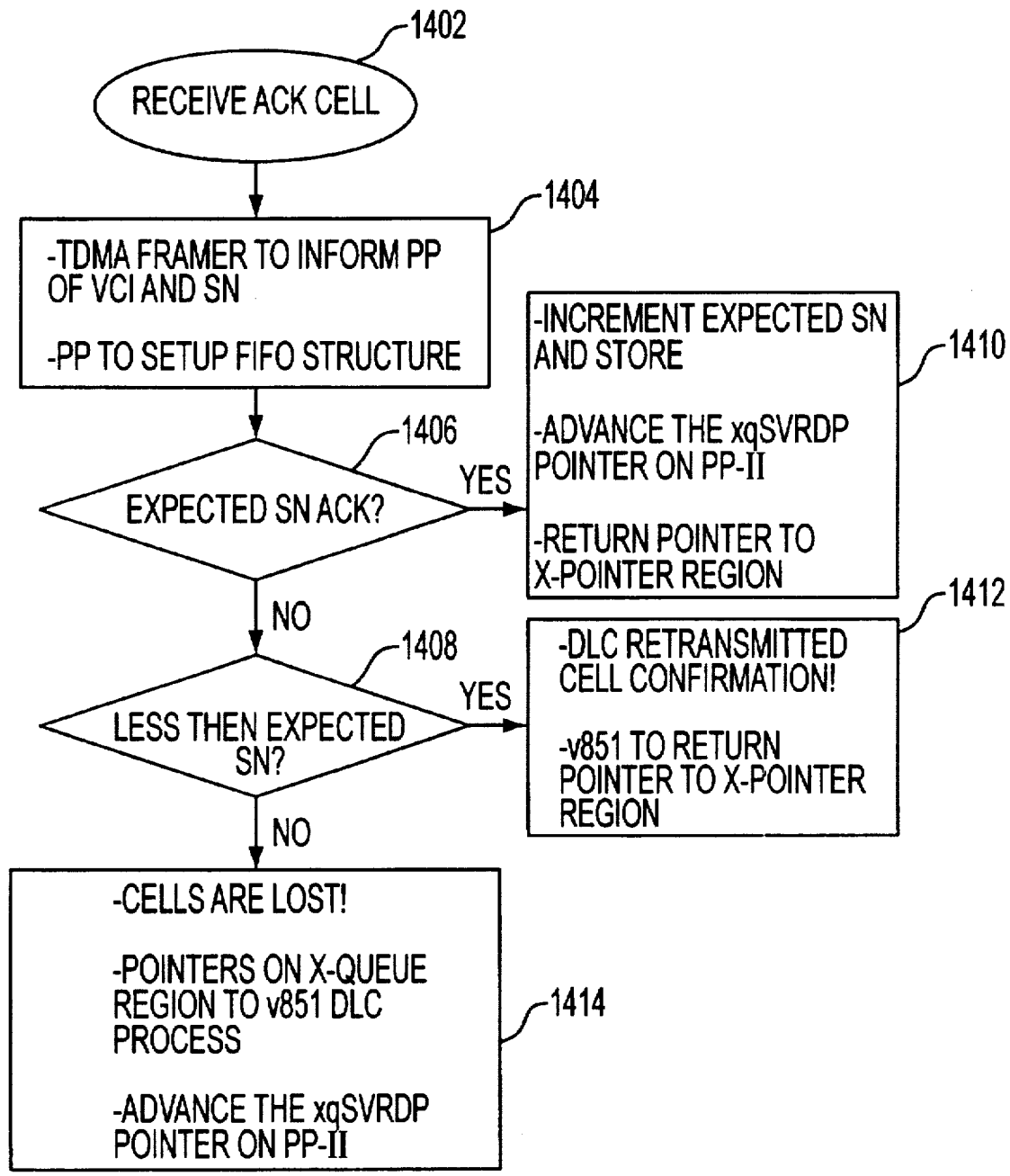
FIG. 14 is a flow diagram showing DLC acknowledgment to NIC.

A 'xqSvrdp' pointer is also part of the XQueue region, and it is used by the DLC to keep track of cell retransmissions. Initially, the 'xqSvrdp' and 'xqReadp' pointers are at the same location. But, as the Framer reads data, the 'xqReadp' pointer advances, and the 'xqSvrdp' value stays pointing at the First transmitted cell awaiting transmission acknowledgment. FIG. 14, shows the process required for DLC Acknowledgment to the NIC.

In summary, 'xqsvrdp' is advanced every time a cell is acknowledged. If the acknowledgment matches the expected WATM cell, the XQueue region pointer returns to the Xpointer region. Otherwise, the v851 is called upon to perform WATM cell retransmission and to control the Cell Pool pointer. The v851 returns the Cell Pool pointer to the Xpointer region when retransmission has successfully been accomplished, or at retransmission time-out.

Figure 16:
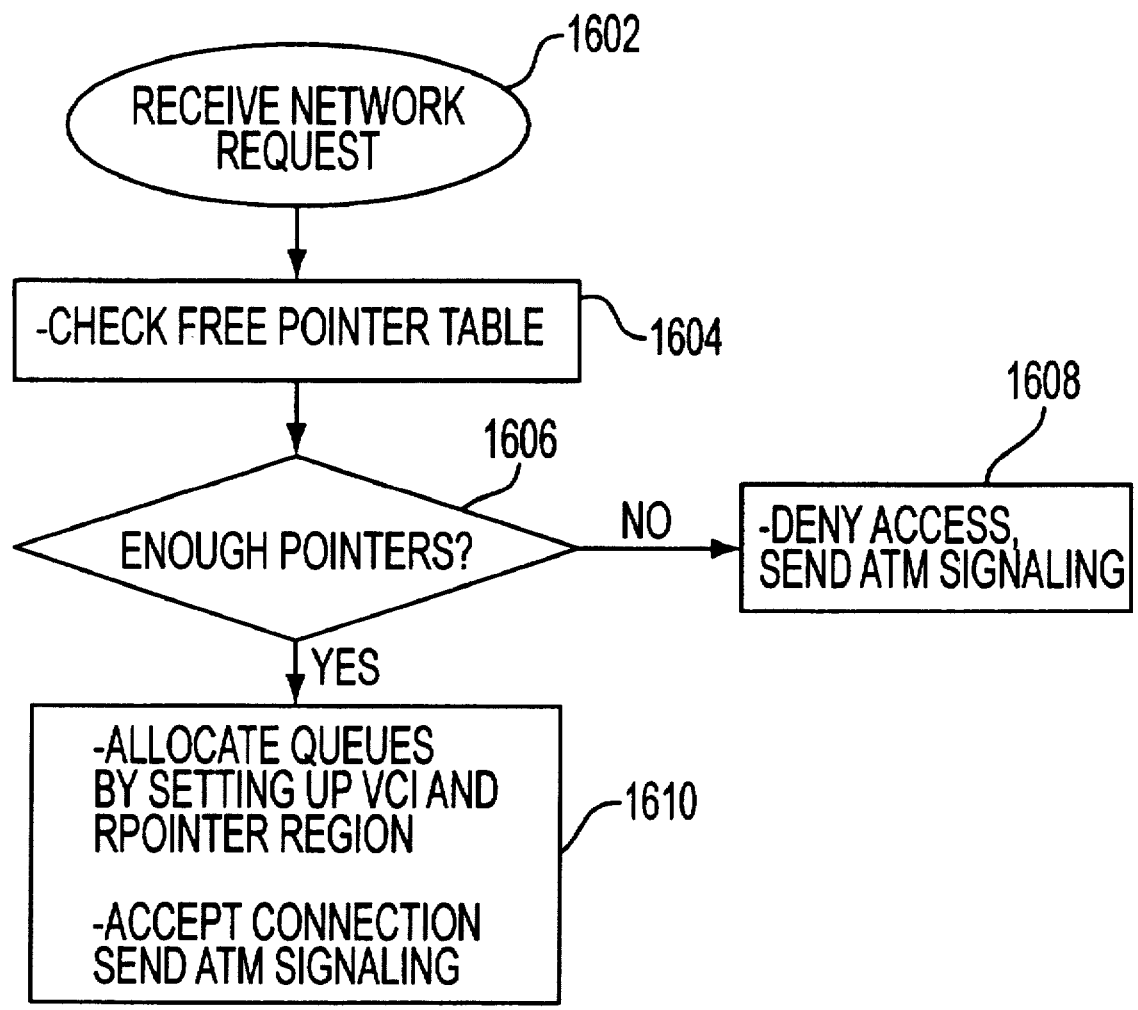
FIG. 16 is a flow diagram showing connection setup from wireless network to v851.
Figure 17:
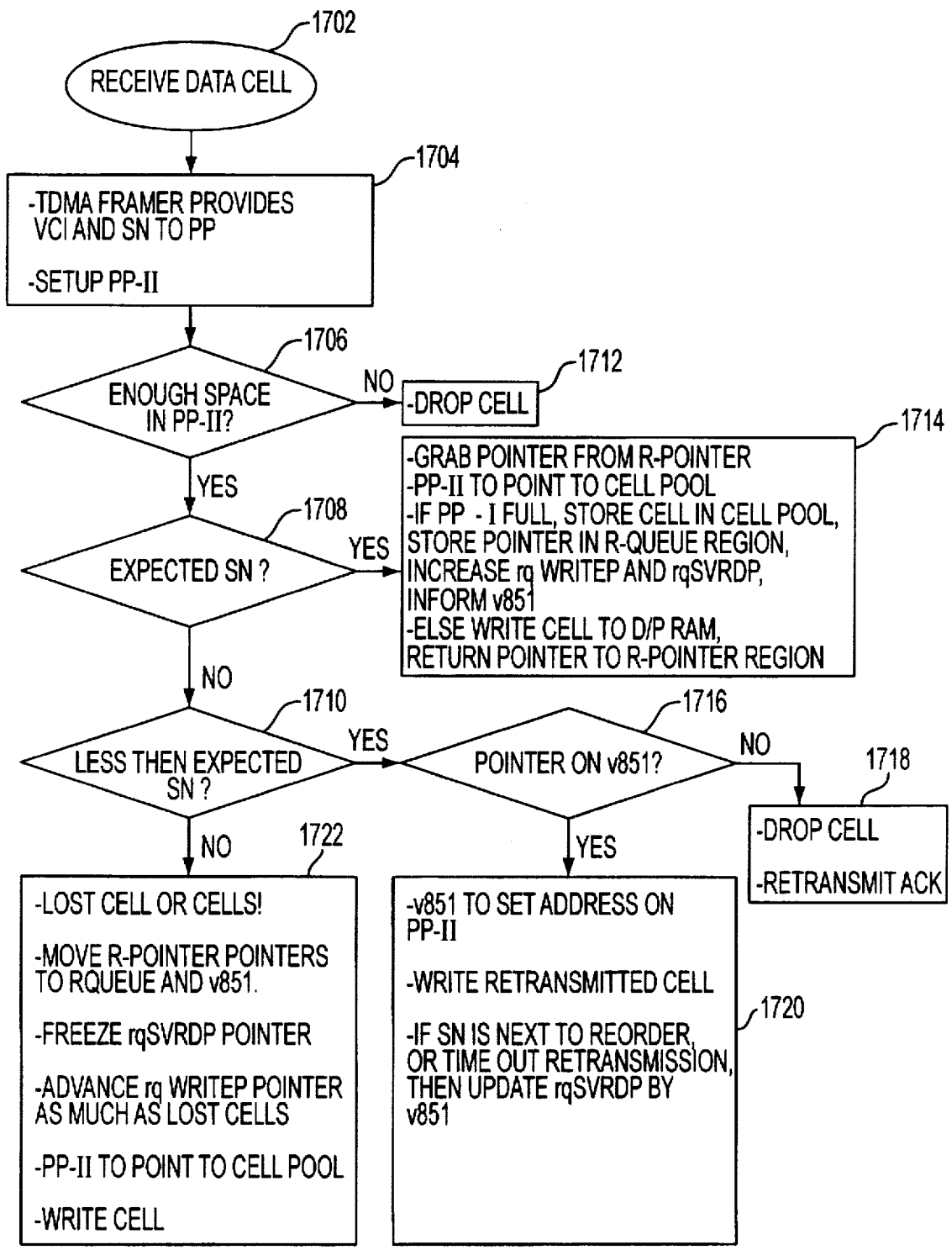
FIG. 17 is a flow diagram showing terminal data transfer from NIC to terminal.

FIG. 15(a) shows the Pointer Processor's RAM structure in the receive direction. The VCI Region 1502, previously described, includes data structures which implement the Rpointer 1504 and Rqueue 1506 regions. The Rpointer region contains the Free Pointer to the Cell Pool RAM, and it is setup as shown in FIG. 16. An example of the Rpointer and Rqueue regions is shown in FIG. 15(b). When WATM data cells are received, a Free pointer is taken from the Rpointer region. If no pointers are found the cell is dropped. Otherwise, the pointer is stored in the Rqueue region. The 'rqWritep' pointer is incremented when cells are received or whenever cell losses are detected by checking the SN value. When cells are lost, Free pointers to the Rqueue region should be proportional to the amount of lost cells. Also, whenever cells are lost, the 'rqSvrdp' is frozen in value indicating the cells that are in correct sequence order. The difference between the 'rqSvrdp' and 'rqReadp' indicates to the Supervisory Mac (v851) which cells are in sequence order and therefore ready for transfer to the Terminal. Whenever the 'rqSvrdp' and 'rq Writep' pointers are equal, no out of sequence transmission has occurred. Out of order cell retransmissions are handled by the v851 which adjusts the 'rqSvrdp' pointer as appropriate. The flowchart shown in FIG. 17 shows the operation of the receiver.

Figure 18:
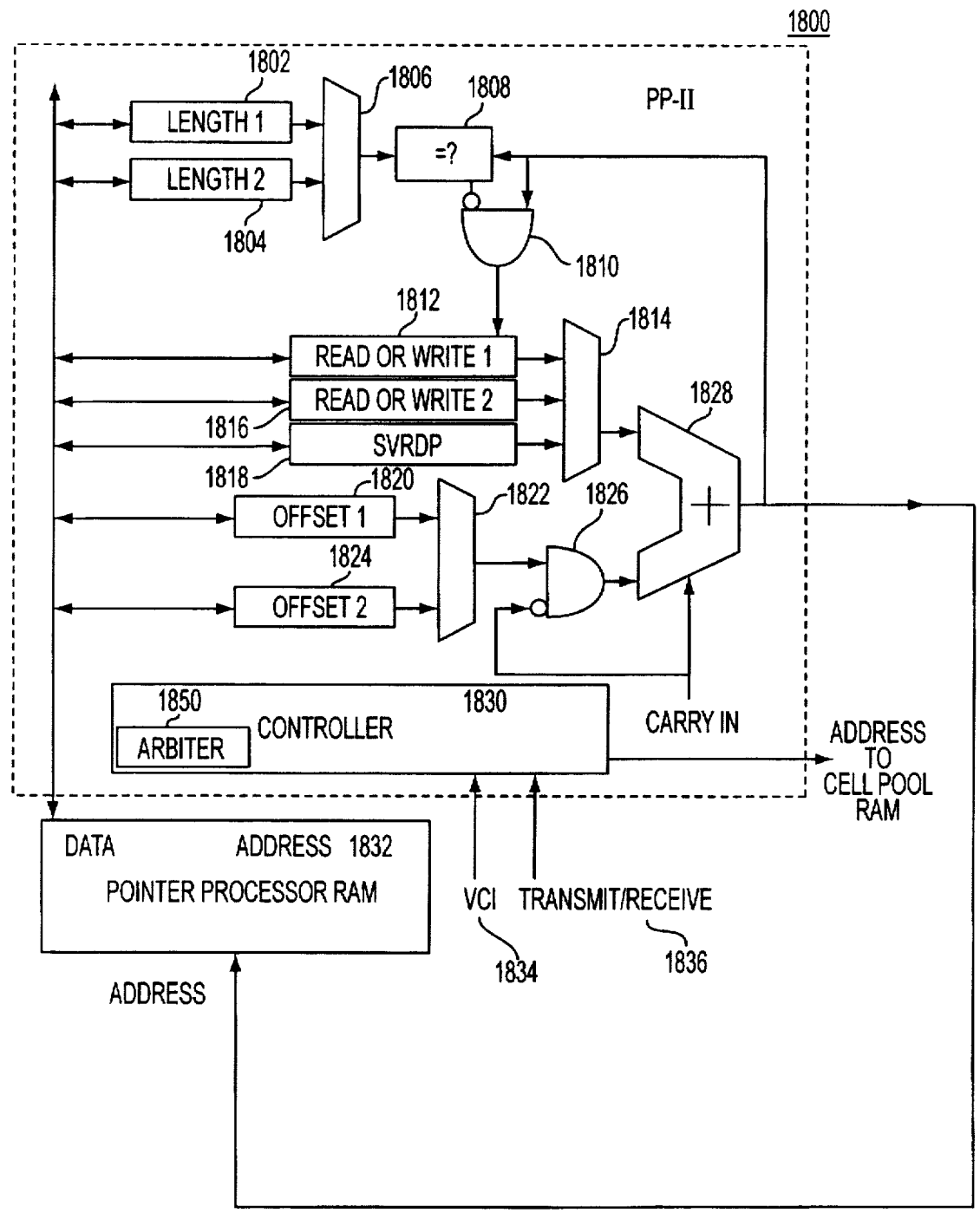
FIG. 18 is a block diagram of the cell pool address generator.

As can be readily appreciated by those skilled in the art, the implementation of PP-II is more complex than that of the PP-I. But, a similar datapath structure can be used to generate the required address pointers to the Cell Pool RAM. FIG. 18 shows such a possible implementation.

Specifically, a 'VCI' value 1834 indicating which queue to access, and a 'Transmit/Receive' signal 1836 indicating which direction data is coming from, is provided to the PP-II Controller 1830. The Controller then accesses the respective VCI Region and load the Xpointer and XQueue, or the RPointer and RQueue parameters in the PP-II registers. For instance, in the transmit direction the 'xLength' value would be loaded in the Length 1 register 1802, and the 'xqLength' in the Length2 register 1804. The 'xOffset' and 'xqOffset' are loaded in the Offset 1 1820 register and Offset 2 register 1824, respectively. The remaining parameters are then loaded in the Read or Write 1 and 2, and Svrdp registers (1812, 1816 and 1818 respectively). The controller then uses Finite State Machines (FSM) or a microprogram to synchronize and perform the WATM Cell Pool Management and DLC. The Controller also arbitrates through the effect of the arbiter 1850, access to the Cell Pool RAM by either the WATM/AAL Co-processor or the TDMA Framer (signals not shown). The controller also provides the pointer (address) to the Cell Pool Ram.

Preferably, the TDMA Framer should be given priority and the WATM/AALCo-processor functionality should be frozen. If Information is being transferred to the Cell Pool by the WATM/AAL Co-processor, its temporary Xpointer and XQueue register status should be stored in the Pointer Processor RAM, and then stored after the TDMA Framer is finished with its task. Finally, access to the Pointer Processor RAM should be arbitrated by the arbiter since the v851 also requires to set up and collect information about queue status on this memory component.

The function of the TDMA Framer is to transmit and receive WATM cells by structuring information in a TDMA/TDD format. It is preferably designed in a flexible manner so as to operate at both the Remote and Base stations. The TDMA Framer should be given priority access to the Cell Pool RAM by control of the PP block whenever data is to be stored or retrieved. Transmission by the Framer should be controlled by an internal table, which is setup by the Supervisory MAC functions running in software at the v851.

While there has been described and illustrated a method of utilizing , it will be apparent to those skilled in the art that modifications and variations are possible without deviating from the broad principle and spirit of the invention which shall be limited solely by the scope of the claims appended hereto.

What is claimed is:

1. A queue management method for a wireless asynchronous transfer mode network interface card, said interface card comprising:

a local bus for interconnecting components on the card;

a bus interface means, connected to the local bus and a system bus contained within the host, for interconnecting the local bus to a system bus contained within the host;

a controller means, connected to the local bus, for controlling local operations on the network interface card;

a randomly-accessible memory means, connected to the local bus, for storage of working program and data;

a read-only memory means, connected to the local bus, for storage of program code and data necessary for operating the controller means;

a dual-ported memory means; connected to the local bus and the bus interface means, for providing communication between the network interface card and the host, said dual-ported memory being partitioned into a plurality of different regions wherein each region stores a particular type of data;

a WATM/IAAL co-processor means, connected to the dual-ported memory means and the local bus, for formatting cells into different AAL, ATM and WATM transport protocols;

a cell pool ram means, connected to the WATM/AAL co-processor means, and the pointer processor means, for buffering cells to be transmitted or received by the network interface card;

a TDMA framing means, connected to the WATM/AAL co-processor means, the local bus means, and the cell pool ram means, for synchronizing and delineating frames received by the network interface card;

a memory pointer processor means, connected to the WATM/AAL co-processor means, the local bus means, and the dual-ported memory means, for generating address locations indicating where data is to be stored or retrieved by the WATM AAL co-processor means and the TDMA framing means;

MODEM/radio means, connected to the local bus means and the TDMA/TDD Framer means, for modulating and demodulating cells to be transmitted and received from the wireless asynchronous transfer mode communications network; and an antenna means, connected to said MODEM/radio means, for sending and receiving cells over said wireless asynchronous transfer mode communications network;

said method comprising the steps of:

when transmitting a set of cells over the wireless asynchronous transfer mode communications network, a) transmitting said cells in a first-in first-out manner under control of the pointer processor means;

b) determining, that a DLC error has occurred for a particular cell;

c) recovering, from the DLC error by informing the controller means of the DLC error such that recovery from this DLC error occurs under the control of the controller means while any remaining cells in the set of cells are transmitted under the control of the pointer processor means; and d) repeating the above steps a–c until all cells in the set of cells are without error or generate a time-out condition;

and when receiving a set of cells over the wireless asynchronous transfer mode communications network, e) receiving said cells in a first-in first-out manner under control of the pointer processor means;

f) determining, that a DLC error has occurred for a particular cell;

g) recovering, from the DLC error by informing the controller means of the DLC error such that recovery from this DLC error occurs under the control of the controller means while any remaining cells in the set of cells are received under the control of the pointer processor means; and h) repeating the above steps e-g until all cells in the set of cells are transmitted correctly or generate a time-out condition.

* * * * *